United States Patent
Hasegawa et al.

(10) Patent No.: US 10,712,644 B2
(45) Date of Patent: Jul. 14, 2020

(54) IMAGE PROJECTION APPARATUS

(71) Applicant: SONY CORPORATION, Tokyo (JP)

(72) Inventors: Hiroshi Hasegawa, Tokyo (JP); Shigenari Yamabe, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/318,234

(22) PCT Filed: Jun. 12, 2017

(86) PCT No.: PCT/JP2017/021675
§ 371 (c)(1),
(2) Date: Jan. 16, 2019

(87) PCT Pub. No.: WO2018/042813
PCT Pub. Date: Mar. 8, 2018

(65) Prior Publication Data
US 2019/0155133 A1 May 23, 2019

(30) Foreign Application Priority Data

Aug. 31, 2016 (JP) .................. 2016-168764

(51) Int. Cl.
*G03B 21/16* (2006.01)
*H04N 5/74* (2006.01)
(Continued)

(52) U.S. Cl.
CPC ......... *G03B 21/16* (2013.01); *G03B 21/2006* (2013.01); *H04N 5/74* (2013.01); *H04N 9/3144* (2013.01); *G03B 21/145* (2013.01)

(58) Field of Classification Search
CPC .. G03B 21/16; G03B 21/2006; G03B 21/145; H04N 5/74; H04N 9/3144
(Continued)

(56) References Cited

U.S. PATENT DOCUMENTS

2007/0070298 A1* 3/2007 Hara ............... G03B 21/18
353/57
2009/0040470 A1* 2/2009 Fukui .............. G03B 21/16
353/58
(Continued)

FOREIGN PATENT DOCUMENTS

JP 2000-330202 A 11/2000
JP 2009-042444 A 2/2009
(Continued)

OTHER PUBLICATIONS

International Search Report dated Jul. 18, 2017 in PCT/JP2017/021675 filed on Jun. 12, 2017.

*Primary Examiner* — Jerry L Brooks
(74) *Attorney, Agent, or Firm* — Oblon, McClelland, Maier & Neustadt, L.L.P.

(57) ABSTRACT

[Object] To provide an image projection apparatus that is able to efficiently cool an inside of a housing.
[Solution] There is provided an image projection apparatus that is a short focus projector including a short focus lens as a projection lens that projects an image on a projection face, the image projection apparatus including: an optical system unit including an optical system component including the projection lens; an air intake port that is provided on a rear face of a housing containing the optical system unit and through which air is caused to flow into an inside of the housing; an air discharge port that is provided on a front face of the housing and through which air inside the housing is discharged; and one or more cooling fans that are provided to be closer to a rear face side than a heat generation component that generates heat among the optical system components, in the inside of the housing.

15 Claims, 4 Drawing Sheets

(51) Int. Cl.
  *G03B 21/20* (2006.01)
  *H04N 9/31* (2006.01)
  *G03B 21/14* (2006.01)

(58) Field of Classification Search
  USPC .......................................................... 353/52
  See application file for complete search history.

(56) References Cited

U.S. PATENT DOCUMENTS

2009/0122274 A1   5/2009  Saito
2016/0142688 A1*  5/2016  Nomoto ............... H04N 9/3144
                                                               353/54
2016/0223889 A1*  8/2016  Fukui ................... G03B 21/145

FOREIGN PATENT DOCUMENTS

| | | |
|---|---|---|
| JP | 2009-122296 A | 6/2009 |
| JP | 2013-044917 A | 3/2013 |
| JP | 2014-191165 A | 10/2014 |

\* cited by examiner

IMAGE PROJECTION APPARATUS

TECHNICAL FIELD

The present disclosure relates to an image projection apparatus that projects an image on a projection face.

BACKGROUND ART

For an image projection apparatus that projects an image on a projection face, a short focus projector has been recently proposed that is able to project an image from a close distance of a projection face. The short focus projector is able to project an image with a shorter distance than a normal projector. Therefore, the short focus projector is able to be provided at a limited space that is close to a projection face, and a shadow of a person is not reflected in a projected image. Such a short focus projector often has a horizontally-long cuboidal profile, and a projecting lens that projects an image on a projection face is often provided at a center portion of a horizontal width.

A temperature of an inside of a housing of an image projection apparatus becomes high due to heat generated from an optical system component such as a light source. High temperature in the inside of the housing leads to performance degradation or shortening of life of components. Therefore, the inside of the housing is cooled with use of a cooling fan, etc. For example, Patent Literature 1 discloses a projecting-type display apparatus in which, in order to efficiently cool each portion inside the apparatus, a flow path is formed so that air that has been taken inside from a cooling air intake port passes through an optical unit, a light source lamp unit, and an electric power supply unit, and is discharged from an outlet.

CITATION LIST

Patent Literature

Patent Literature 1: JP 2000-330202A

DISCLOSURE OF INVENTION

Technical Problem

Here, a short focus projector is provided close to a projection face such as a wall. Therefore, in a case where an outlet for cooling air that has passed through an inside of a housing is provided at a rear face that faces the projection face, warmed air stays between the rear face of a housing and the projection face, and thus, is not efficiently discharged. Further, regarding a side face of the housing as well, a wall, a speaker, or the like may possibly be provided close to the image projection apparatus. Therefore, efficiency in air discharge from the side face may be deteriorated due to the wall or the like. In contrast, air is taken, as a cooling medium, from outside. In terms of air intake as well, in a case where an air intake port is provided on a face (a bottom face) that faces an installation face of the image projection apparatus, dust on the installation face is sucked, and is possibly attached to the optical system components located inside. This causes degradation of luminance. Further, even in a case where air inside the apparatus is blown against a component that is a target for cooling, the air inside is brought into contact with a heat generation object, and the temperature thereof has increased. This reduces cooling efficiency.

Therefore, a novel and improved image projection apparatus that is able to efficiently cool an inside of a housing is proposed in the present disclosure.

Solution to Problem

According to the present disclosure, there is provided an image projection apparatus that is a short focus projector including a short focus lens as a projection lens that projects an image on a projection face, the image projection apparatus including: an optical system unit including an optical system component including the projection lens; an air intake port that is provided on a rear face of a housing containing the optical system unit and through which air is caused to flow into an inside of the housing; an air discharge port that is provided on a front face of the housing and through which air inside the housing is discharged; and one or more cooling fans that are provided to be closer to a rear face side than a heat generation component that generates heat among the optical system components, in the inside of the housing.

In addition, according to the present disclosure, there is provided an image projection apparatus that is a short focus projector including a short focus lens as a projection lens that projects an image on a projection face, the image projection apparatus including: an optical system unit including an optical system component including the projection lens; an air intake port that is provided on a rear face of a housing containing the optical system unit and through which air is caused to flow into an inside of the housing; an air discharge port that is provided on a front face of the housing and through which air inside the housing is discharged; and an air discharge fan that is provided to be closer to a rear face side than a heat generation component that generates heat among the optical system components, in the inside of the housing.

Advantageous Effects of Invention

As described above, according to the present disclosure, it is possible to provide an image projection apparatus that makes it possible to efficiently cool an inside of a housing. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
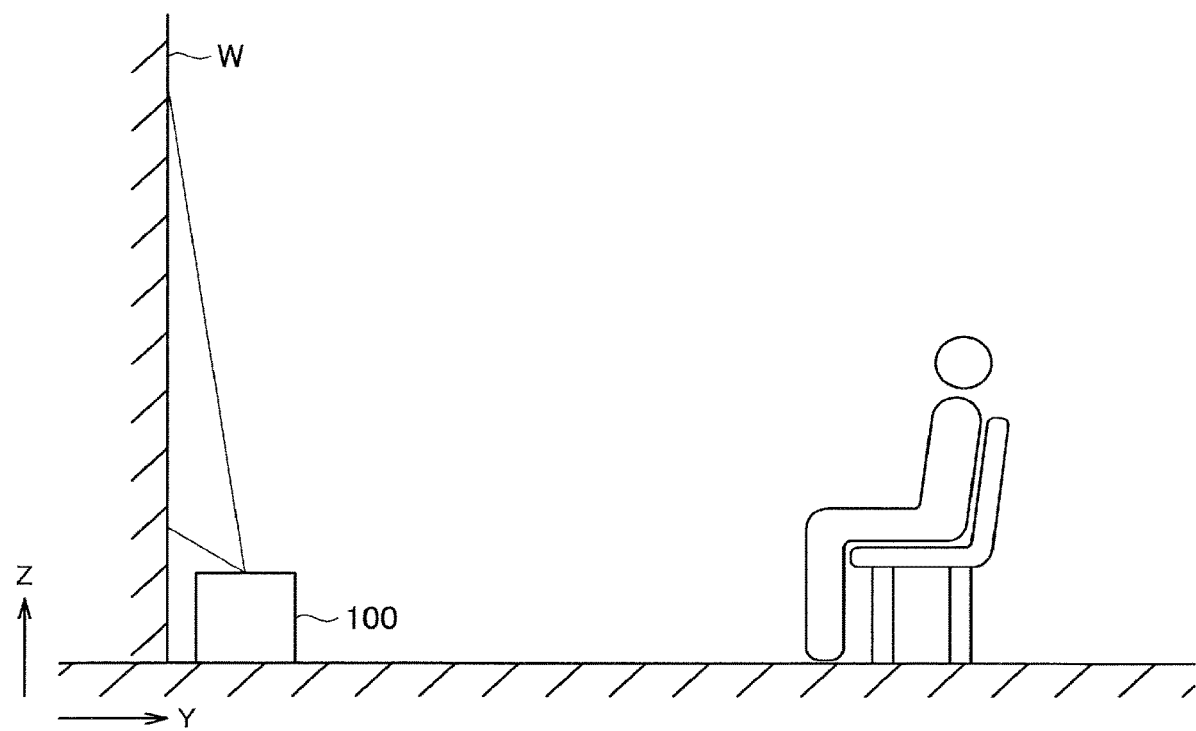
FIG. 1 is a diagram illustrating a use example of an image projection apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the descriptions will be made in the following order.
1. Apparatus Configuration
2. Cooling structure of Optical System Component
  2.1 Arrangement of Fan
  2.2 Air Discharge Flow Path
3. Conclusion <1. Apparatus Configuration>

Figure 2:
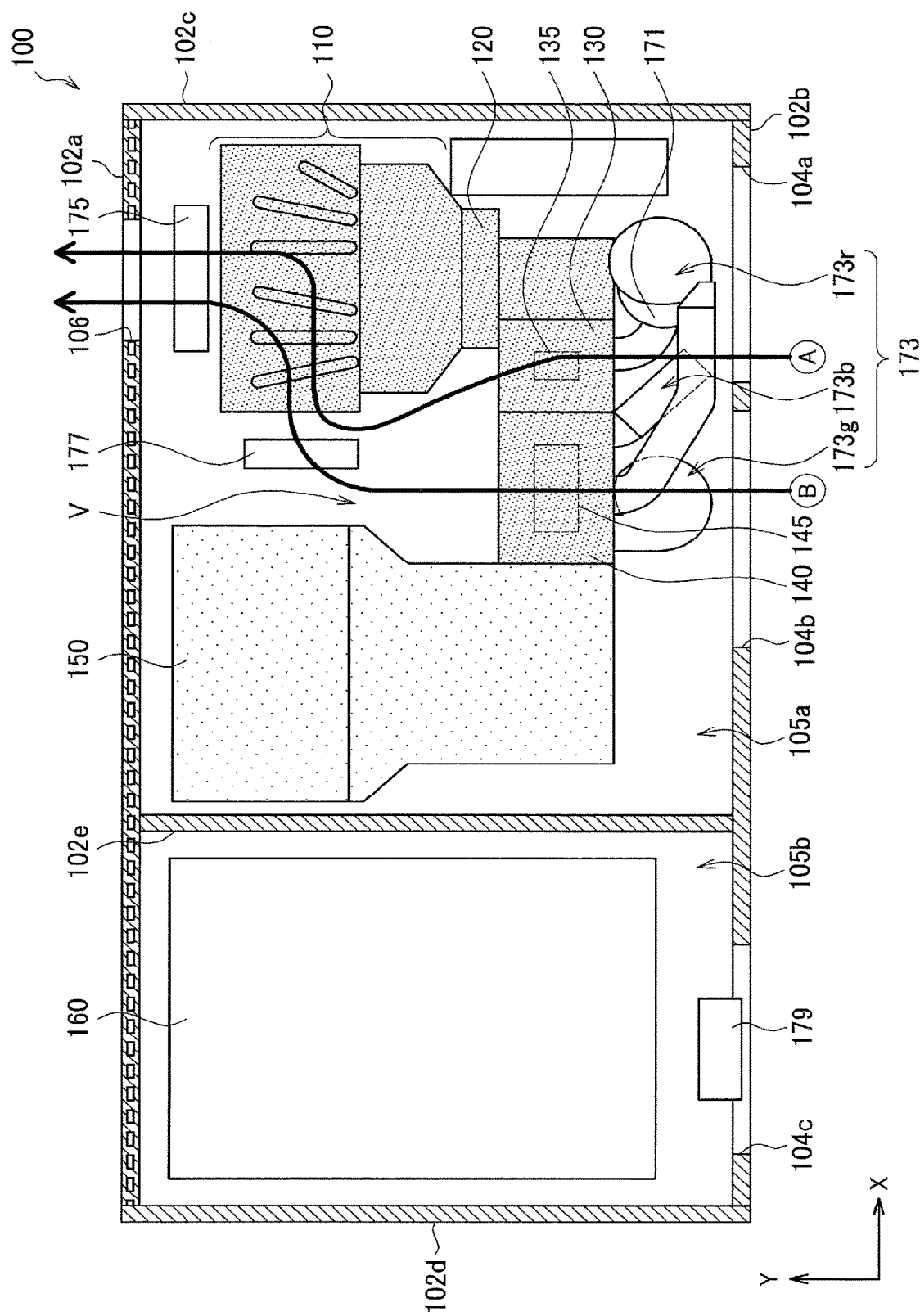
FIG. 2 is a schematic plan view of an inner structure of the image projection apparatus according to the embodiment.

First, a description is given of a configuration of an image projection apparatus according to an embodiment of the present disclosure on the basis of FIGS. 1 and 2. FIG. 1 is a diagram illustrating a use example of an image projection apparatus 100 according to the present embodiment. FIG. 2 is a schematic plan view of an inner structure of the image projection apparatus 100 according to the present embodiment.

The image projection apparatus 100 according to the present embodiment is a short focus projector that is able to project an image to, for example, a projection face from a close distance. As illustrated in FIG. 1, such an image projection apparatus 100 is able to be so provided as to be close to a wall face W that is used as a projection face of the image. Therefore, it is possible to provide the image projection apparatus 100 efficiently in a space. Further, there is no flow line of a person between the image projection apparatus 100 and the wall face W, which prevents a shadow of a person from being reflected in a projected image.

As illustrated in FIGS. 1 and 2, the image projection apparatus 100 according to the present embodiment has a substantially rectangular solid profile. The length in the width direction (X direction) in which a side face 102*c* faces a side face 102*d* is greater than the length in the depth direction (Y direction) in which a front face 102*a* faces a rear face 103*b*. The image projection apparatus 100 includes a light source unit 110, a fluorescent body wheel unit 120, a polarization conversion element unit 130, a liquid crystal display element unit 140, a projecting unit 150, and an electric power supply unit 160 in such a housing 102. Inside the housing 102, two spaces 105*a* and 105*b* are formed by a partition 102*e* in the width direction. Optical components including the light source unit 110, the fluorescent body wheel unit 120, the polarization conversion element unit 130, the liquid crystal display element unit 140, and the projecting unit 150 are provided in the first space 105*a*. The electric power supply unit 160 is provided in the second space 105*b*.

Such an image projection apparatus 100 is, for example, a 3LCD (Liquid Crystal Display) projector. In the 3LCD projector, pieces of light each having a corresponding one of three primary colors of red, green, and blue are generated from light emitted from the light source unit 110, and the pieces of light are each transmitted through a corresponding one of three LCDs of the liquid crystal display element unit 140, to thereby generate an image to be projected on the projection face.

The light source unit 110 generates a light source emitting light that is a source of an image. The light source unit 110 according to the present embodiment is a solid light source, and for example, may be a light emitting diode (light emitting diode; LED) or a semiconductor laser (laser diode; LD). For example, a laser light source using the semiconductor laser has a long operating life, low electric power consumption, and high luminance. For example, the light source unit 110 is a blue color laser diode that emits light having a blue light wavelength region. The laser light emitted from the light source unit 110 is outputted to the fluorescent body wheel unit 120.

In the fluorescent body wheel unit 120, a fluorescent body wheel having a fluorescent body laminated on a disc-shaped substrate is provided. The fluorescent body wheel unit 120 converts the laser light emitted from the light source unit 110 into light having another wavelength region. The fluorescent body wheel unit 120 includes a fluorescent body wheel having a fluorescent body laminated on the disc-shaped substrate. The fluorescent body excites the laser light that has entered the fluorescent body and outputs light having another wavelength. For example, the fluorescent body wheel unit 120 includes, as a fluorescent body, a yellow color fluorescent body that outputs light having a yellow color wavelength region which is excited by blue color laser light emitted from a fluorescent body blue color laser diode and includes light having a green color wavelength region and light having a red color wavelength region. The fluorescent body wheel unit 120 generates red color light, green color light, and blue color light on the basis of light entering from the light source unit 110, and outputs these pieces of light to the polarization conversion element unit 130.

The polarization conversion element unit 130 includes a polarization conversion element 135 that causes a polarization direction of each of the red color light, the green color light, and the blue color light that have entered from the fluorescent body wheel unit 120 to be aligned in a corresponding one of predetermined polarization directions. The light that has entered from the fluorescent body wheel unit 120 includes waves having various directions. Here, for example, in a case where a liquid crystal display element has a feature that allows only light having a predetermined polarization direction to be transmitted, as with HTPS (High Temperature Poly-Silicon), if there is light that is unable to be transmitted through the liquid crystal display element, an image becomes darker as the amount of such light becomes greater. Therefore, in the polarization conversion element unit 130, the polarization direction of the light that enters the liquid crystal display element unit 140 is converted from a direction of a horizontal wave to a direction of a vertical wave, to thereby allow light to be able to be transmitted through the liquid crystal display element 145, making it possible to make an image to be projected from the projecting unit 150 brighter. The light that has been aligned in the predetermined polarization direction by the polarization conversion element unit 130 is outputted to the liquid crystal display element unit 140.

The liquid crystal display element unit 140 includes a liquid crystal panel for red color, a liquid crystal panel for green color, and a liquid crystal panel for blue color, and an optical member that synthesizes signal light beams of an image generated by each liquid crystal panel, and generates image signal light beams to be projected from the projecting unit 150. The liquid crystal panel for red color, the liquid crystal panel for green color, and the liquid crystal panel for blue color are collectively referred to as a liquid crystal display element 145. The red color crystal liquid panel, the green color liquid crystal panel, and the blue color crystal panel may be each an active matrix driving type transmissive LCD such as the HTPS or the like. The liquid crystal panel for each color modulates each of pieces of light that has entered a corresponding one of the panels in accordance with an input image signal, and generates a signal light beam of an image corresponding to each of RGB. The signal light beam modulated by each of the liquid crystal panels is caused to enter a dichroic prism, and synthesized. The dichroic prism is so formed in a rectangular solid that is made by combining four triangle poles as to reflect a red color signal light beam and a blue color signal light beam, to thereby transmit a green color signal light beam. The image signal light beam synthesized by the dichroic prism is caused to enter the projecting unit 150.

The projecting unit 150 projects the image signal light beam that generated by the liquid crystal display element unit 140 on a projection face. The projecting unit 150 according to the present embodiment includes, as a projecting lens, a short focus projection lens having a short projection distance from the image projection apparatus 100 to the projection face. It is possible to perform projection with a large screen size and a short distance by using the short focus projection lens.

The electric power supply unit 160 includes an electric power supply circuit that generates electric power for driving the image projection apparatus 100 from inputted electric power. The electric power is supplied by the electric power supply unit 160 to each component. The electric power supply unit 160 is cooled by an air cooling fan 179 provided at the air intake port 104c.

In order to cool the optical system components, for example, the image projection apparatus 100 is provided with three air intake ports 104a and 104b on the rear face 102b of the housing 102, and an air discharge port 106 on the front face 102a. Further, in the first space 105a, a cooling fan 171 that cools the polarization conversion element unit 130, cooling fans 173r, 173b and 173g that cool the liquid crystal display element unit 140, and an air discharge fan 175 for discharging air inside the housing 102 from the air discharge port 106. A detailed description is given later of a cooling structure of the optical system components. It is to be noted that, in the present embodiment, the two air intake ports 104a and 104b, and the air discharge port 106 are provided. However, the present disclosure is not limited to such an example. The number of these ports is not limited thereto. It is possible to further improve cooling efficiency as area of an opening of each of the air intake port and the air discharge port is larger. However, a dust-proof property as well as resistance and strength properties are degraded. Further, a design property is also degraded in a case where a large opening is formed on the front face 102a that is visually recognized easily by a user. Therefore, it is desirable to set area of the opening as small as possible.

<2. Cooling Structure of Optical System Component>

In the image projection apparatus 100 according to the present embodiment, as illustrated in FIG. 2, regarding the optical system components provided in the first space 105a, the light source unit 110 and the projecting unit 150 are provided on the front face 102a side that faces a user. Further, the fluorescent body wheel unit 120 and the polarization conversion element unit 130 are provided toward the rear face 102b side from the light source unit 110. The liquid crystal display element unit 140 is provided next to the polarization conversion element unit 130 in the width direction. In other words, regarding the optical system components, the light source unit 110, the fluorescent body wheel unit 120, the polarization conversion element unit 130, the liquid crystal display element unit 140, and the projecting unit 150 are arranged in U-shape. Such an arrangement makes it possible to efficiently arrange the optical system components of the image projection apparatus 100, in terms of space.

In the optical system components provided in such an image projection apparatus 100, the light source unit 110, the fluorescent body wheel unit 120, the polarization conversion element unit 130, and the liquid crystal display element unit 140 are main heat generation components. Of these components, the light source unit 110 has the highest temperature. The amount of heat generation from the liquid crystal display element unit 140 is small, and the amount of heat generation is larger in the following order of the fluorescent body wheel unit 120, the polarization conversion element unit 130. In other words, the optical system components are provided in such an order that the temperatures of the optical system components become higher toward the light source unit 110 on the front face 102a side from the rear face 102b of the housing 102.

An image projection apparatus normally includes a cooling structure that takes outside air from an air intake port to thereby cool the inside of a housing and discharge warmed air from an air discharge port, in order to prevent a temperature inside the apparatus from becoming high and exceeding than an allowable value. The air discharge port is typically provided at a rear face side that is not easily recognizable from a user. However, the image projection apparatus 100, which is a short focus projector, of the present embodiment is provided close to the wall face W. Therefore, in a case where the air intake ports 104a and 104b are provided on the rear face 102b, warmed air stays between the rear face 102b and the wall face W, which prevents the warmed air from being discharged efficiently. Further, the wall face W or an object such as furniture or a speaker may be provided also on the side face 102c and 102d sides of the image projection apparatus 100, and even in a case where air discharge ports are provided on the side faces 102c and 102d, discharge of warmed air may possibly be inhibited. Alternatively, in a case where an air intake port is provided on a bottom face that faces an installation face, dust on the installation face is sucked, and is possibly attached to the optical system components located inside. This causes degradation of luminance.

Figure 3:
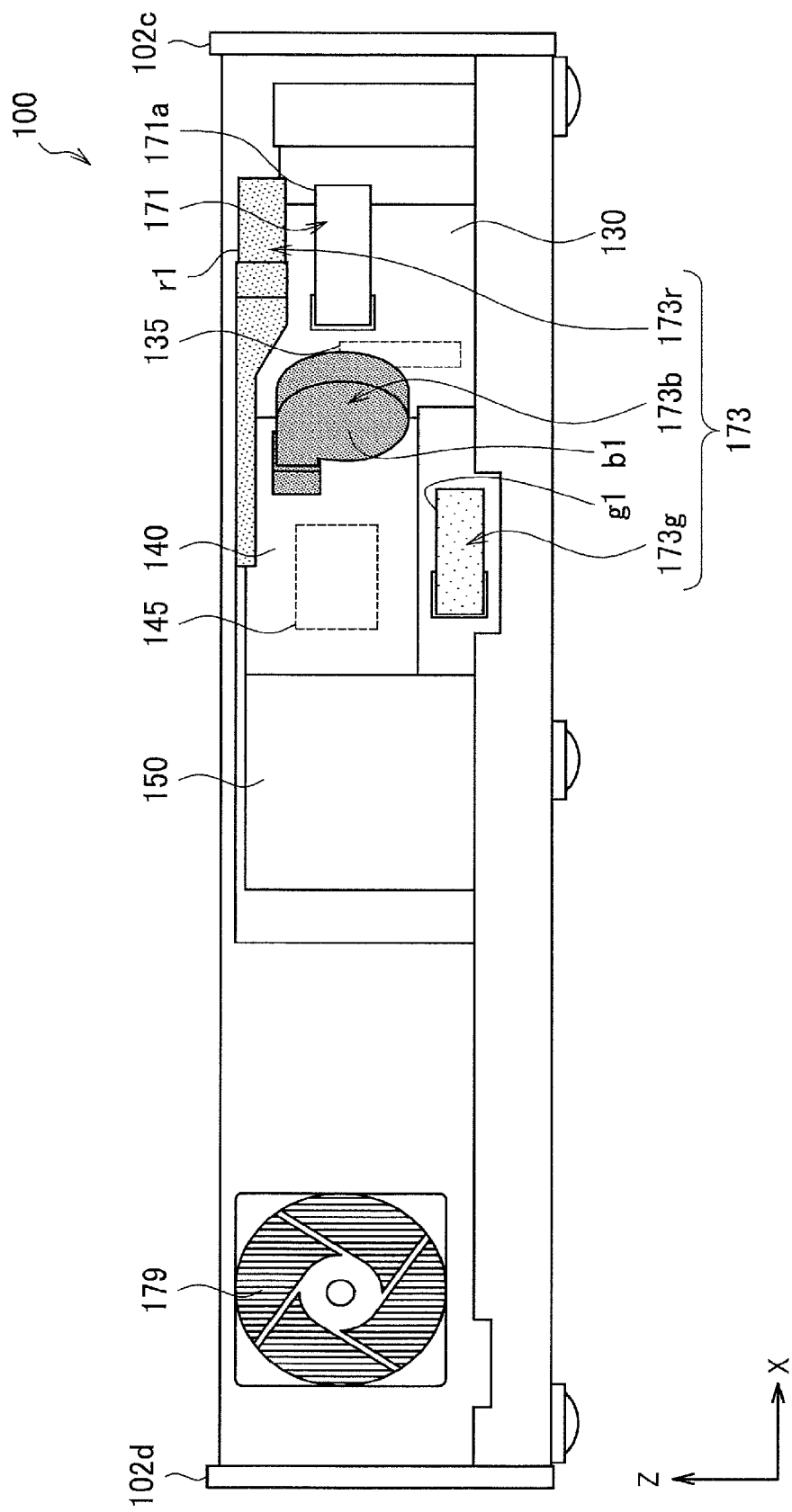
FIG. 3 is a schematic rear view of the cooling structure of the image projection apparatus according to the embodiment, and illustrates a state in which a rear face of a housing is removed.
Figure 4:
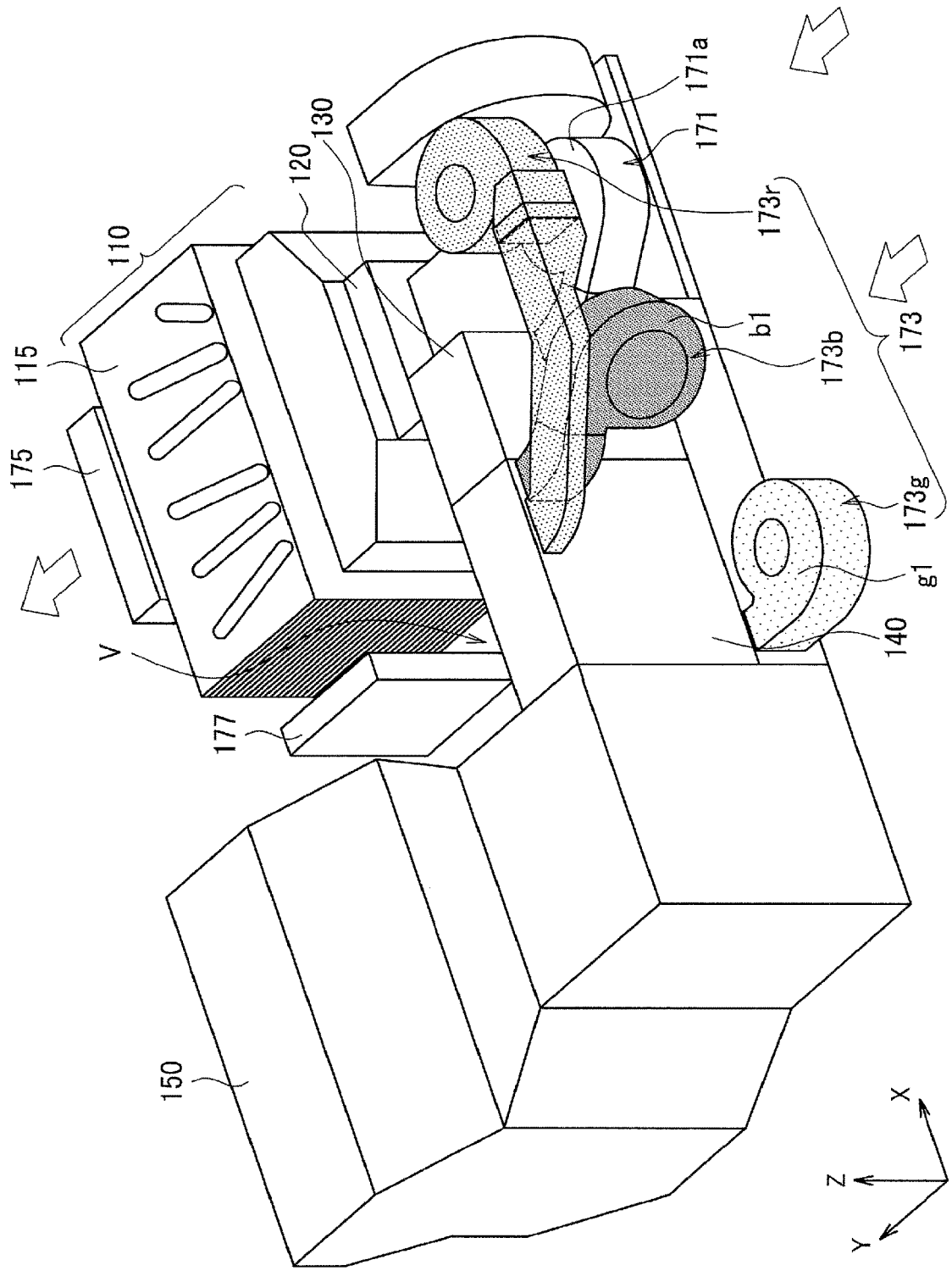
FIG. 4 is a schematic perspective view of an optical system unit of the image projection apparatus according to the embodiment.

Therefore, a cooling structure that efficiently cools the inside of a housing is formed, in the image projection apparatus 100 according to the present embodiment. In particular, the cooling structure is efficient in the first space 105a in which various optical system components, as heat sources in the image projection apparatus 100, are provided. In the following, a description is given of the cooling structure of the image projection apparatus 100 according to the present embodiment on the basis of FIGS. 2 to 4. FIG. 3 is a schematic rear view of a cooling structure of the image projection apparatus 100 according to the present embodiment, and illustrates a state in which the rear face 102b of the housing 102 is removed. FIG. 4 is a schematic perspective view of an optical system unit of the image projection apparatus 100 according to the present embodiment.

[Arrangement of Fan]

A cooling fan for cooling the optical system components is provided in the image projection apparatus 100 according to the present embodiment. Specifically, the cooling fan 171 that cools the polarization conversion element 135 of the polarization conversion element unit 130, and the cooling fan 173 that cools the liquid crystal display element 145 of the liquid crystal display element unit 140 are provided. The cooling fan 173 includes cooling fans 173r, 173b, and 173g that are respectively provided for a corresponding one of the three crystal display panels constituting the liquid crystal display element 145. Air blown from the cooling fan 171 is guided to the polarization conversion element unit 130 via a duct. Air blown from the cooling fans 173r, 173b, and 173g is guided to the liquid crystal display element unit 140 via a duct, etc. Further, the air discharge fan 175 for discharging air inside the housing from the air discharge port 106 is provided. The air discharge fan 175 is so provided as to be closer to the front face 102a side than the heat generation components generating heat, among the optical system components constituting the optical system unit.

For example, a sirocco fan may be used for the cooling fans 171 and 173r, 173b and 173g that cool the polarization conversion element unit 130 and the liquid crystal display element unit 140. The sirocco fan is able to perform strong ventilation with high pressure for each component. Therefore, the sirocco fan is suitable for local cooling. In contrast, for example, an axial fan may be used for the air discharge fan 175. The axial fan performs weak ventilation but is able to send much air. Therefore, the axial fan is suitable for discharging.

In a case where air inside the first space 105a is discharged outside by the air discharge fan 175, the same amount of air as the discharged air is taken from the air intake ports 104a and 104b on the rear face 102b side. The air taken from the air intake ports 104a and 104b is sucked by the air discharge fan 175, passes through the first space 105a, as illustrated in FIG. 2, along the air discharge flow paths A and B, and is discharged from the air discharge port 106. The air discharge flow path A allows air that is taken inside the housing 102 from the air intake port 104a to pass through the polarization conversion element unit 130 and the fluorescent body wheel unit 120, and allows the resultant air to be discharged from the air discharge port 106 through the light source unit 110. Further, the air discharge flow path B allows air that is taken inside the housing 102 from the air intake port 104b to pass through the liquid crystal display element unit 140, and allows the resultant air to be discharged from the air discharge port 106 through the light source unit 110.

In the air discharge flow path B, the air that has cooled the liquid crystal display element unit 140 goes toward the light source unit 110 through a space V that is formed between the light source unit 110 and the projecting unit 150. At this occasion, for example, as illustrated in FIGS. 3 and 4, an auxiliary fan 177 may be provided in the space V formed between the light source unit 110 and the projecting unit 150, so that the air that has passed through the liquid crystal display element unit 140 is reliably guided to the light source unit 110. For example, the axial fan may be used for the auxiliary fan 177. This makes it possible to reliably guide the air that has passed through the liquid crystal display element unit 140 to the light source unit 110, allowing for the formation of a distinct air discharge flow path B.

In the image projection apparatus 100 according to the present embodiment, the cooling fans 171, 173r, 173b, and 173g that cool the polarization conversion element unit 130 and the liquid crystal display element unit 140 are so provided as to be closer to the rear face 102b side than the polarization conversion element 135 and the liquid crystal display element 145 that are the cooling targets. As soon as the air taken from the air intake ports 104a and 104b on the rear face 102b side is taken inside the housing 102, the air is taken into each of the cooling fans 171, 173r, 173b, and 173g, and thereafter, blown against the polarization conversion element 135 and the liquid crystal display element 145. This makes it possible to blow the air against the heat generation components before the air is warmed inside the housing 102, leading to the improvement of cooling efficiency. The improvement of cooling efficiency makes it possible to obtain a sufficient effect even when the size of the cooling fan is made small. Therefore, it is possible to make an apparatus small and reduce cost. Further, performing air intake from the rear face 102b side prevents dust on an installation face from being sucked.

It is to be noted that it is also possible to provide the cooling fan 171 that cools the polarization conversion element 135 in the space V that is formed between the light source unit 110 and the projecting unit 150 in consideration of the layout of the optical system components, in terms of space. However, in a case in which the cooling fan 171 is provided in the space V, a space corresponding to the size of the cooling fan 171 is needed to be left, a result of which the size of the optical system unit configured by arranging the optical system components in U-shape becomes large. As a result, the overall size of the image projection apparatus 100 also becomes large. Further, in a case in which the cooling fan 171 is provided in the space V, air that is taken by the cooling fan 171 has been warmed inside the housing 102, a result of which the cooling efficiency of the polarization conversion element 135 is low. Due to this, it is preferable to so provide the cooling fan 171 as well, as to be closer to the rear face 102b side than the polarization conversion element unit 130.

Further, in the image projection apparatus 100 according to the present embodiment, the cooling fans 171, 173r, 173b, and 173g are so provided as not to block the air discharge flow paths A and B. As illustrated in FIG. 2, the two air discharge flow paths A and B are so arranged as to be in substantially parallel with the side faces 102c and 102d that are short sides of the housing 102, i.e., along the depth direction (Y direction). Forming such air discharge flow paths A and B shortens the distance of the air as a cooling medium passing through the inside of the first space 105a, to thereby make it possible to prevent the air that has been warmed during flowing the inside of the first space 105a from staying longer in the first space 105a. This makes it possible to cause the inner space of the housing 102 to be less likely to be warmed. In order not to block the flow from such a rear face 102b toward the front face 102a, the cooling fans 171, 173r, 173b, and 173g are so provided that air intake faces 171a, r1, b1, and g1 do not substantially face the flow in the Y direction.

Specifically, as illustrated in FIGS. 2 to 4, the cooling fans 171, 173r, and 173g are so provided that the air intake faces 171a, r1, and g1 face upward (a height direction, a Z direction). This allows area in which the air taken from the air intake ports 104a and 104b collides with the cooling fan to be reduced, which prevents the air discharge flow paths A and B from being blocked. Further, regarding the cooling fan 173b, the air intake face b1 is substantially in parallel with the height direction (the Z direction), and is arranged in a slightly inclined manner with respect to the depth direction (the Y direction). In other words, as illustrated in FIGS. 2 to 4, causing the air intake face b1 of the cooling fan 173 to be inclined toward the liquid crystal display element unit 140 as a cooling target makes it possible to guide the air taken inside the housing 102 from the air intake port 104b to the liquid crystal display element unit 140. As a result, the air discharge flow path B that cools the liquid crystal display element unit 140 is formed, making it possible to efficiently cool the liquid crystal display element unit 140 as a cooling target.

In this way, regarding the cooling fans 171, 173r, 173b, and 173g, in order not to block the air discharge flow paths A and B, the air intake faces 171a, r1, b1, and g1 are so arranged as to be in substantially parallel with the air discharge flow paths A and B going from the air intake ports 104*a* and 104*b* toward the air discharge port 106.

[2.2. Air Discharge Flow Path]

As described above, as illustrated in FIGS. 2 to 4, cooling of the optical system components of the image projection apparatus 100 according to the present embodiment is performed from the rear face 102*b* of the housing 102 toward the front face 102*a*. The air taken from the two air intake ports 104*a* and 104*b* that are formed on the rear face 102*b* passes through the first space 105*a* and absorbs heat of the optical system components, and is discharged from the air discharge port 106 of the front face 102*a*. In the image projection apparatus 100, the air discharge flow path A is formed which causes the air taken from the air intake port 104*a* to pass through the polarization conversion element unit 130, the fluorescent body wheel unit 120, and the light source unit 110 and to be discharged from the air discharge port 106. Further, in the image projection apparatus 100, the air discharge flow path B is formed which causes the air taken from the air intake port 104*b* to pass through the liquid crystal display element unit 140 and the light source unit 110 and to be discharged from the air discharge port 106. In any of the air discharge flow paths, the warmed air is discharged from the air discharge port 106 through the light source unit 110 at the end. This is due to the fact that the amount of heat generation from the light source unit 110 is the greatest among the heat generation components that generate heat out of the optical system components of the image projection apparatus 100.

Cooling of the optical system components are performed by taking outside air, as a cooling medium, from the air intake ports 104*a* and 104*b*, to thereby cause heat possessed by each component to be absorbed while causing the outside air to pass through the first space 105*a*. Here, assuming that the air intake ports 104*a* and 104*b* side is an upstream side and the air discharge port 106 is a downstream side in the air discharge flow path, temperature of the air taken inside the housing from the air intake ports 104*a* and 104*b* increases as the air goes from the upstream toward the downstream of the air discharge path. Therefore, temperature of air that cools the components differs depending on the locations of the optical system components provided in the first space 105*a*. Further, the amount of heat generation differs for each of the optical system components. Therefore, forming the air discharge flow path in which the air taken inside the housing 102 from the air intake port 104*a* and 104*b* flows from components each having a low temperature to components each having a high temperature makes it possible to efficiently cool each of the optical system components.

In the image projection apparatus 100 according to the present embodiment, the light source unit 110, the fluorescent body wheel unit 120, the polarization conversion element unit 130, and the liquid crystal display element unit 140 are main heat generation components. Of these components, the light source unit 110 has the highest temperature. Further, the amount of heat generation from the liquid crystal display element unit 140 is small, and the amount of heat generation is larger in the following order of the fluorescent body wheel unit 120, the polarization conversion element unit 130. Here, as illustrated in FIG. 2, the polarization conversion element unit 130 and the liquid crystal display element unit 140 each having a small amount of heat generation are provided on the rear face 102*b* side. The light source unit 110 having a large amount of heat generation is provided on the front face 102*a* side. Therefore, providing the air intake ports 104*a* and 104*b* on the rear face 102*b* of the housing 102 and providing the air discharge port 106 at a location facing the light source unit 110 which has the highest temperature among the components at the front face 102*a* allow the air discharge flow paths A and B in which the air flows from the components each having a low temperature to the components each having a high temperature to be formed. It is to be noted that the temperatures of the heat generation components may be each specified on the basis of, for example, a temperature during a rated operation.

In the present embodiment, the air intake ports 104*a* and 104*b* are respectively provided for the polarization conversion element unit 130 and the liquid crystal display element unit 140 each having a small amount of heat generation, to thereby make it possible to initially cool the polarization conversion element unit 130 and the liquid crystal display element unit 140. Further, in the air discharge flow path A, the air that has cooled the polarization conversion element unit 130 cools the fluorescent body wheel unit 120 having a higher temperature than the temperature of the polarization conversion element unit 130, and cools the light source unit 110 at the end. In contrast, in the air discharge flow path B, the air that has cooled the liquid crystal display element unit 140 passes through the space between the light source unit 110 and the projecting unit 150 and cools the light source unit 110 at the end. In this way, it is possible to cool each component with air having a lower temperature than temperatures of the components as cooling targets.

This holds true for the perspective of a temperature specification of each of the optical system components. For example, an allowable temperature for the light source unit 110 is about 70° C. However, an allowable temperature for the liquid crystal display element unit 140 is about 50° C. Therefore, there is a possibility that the temperature of air when the air hits each component becomes considerably high for the liquid crystal display element unit 140, even in a case where the temperature does not cause any problem for the light source unit 110. Therefore, it is desirable to cool the components in the order from a component having a lower allowable temperature, in order to maintain the function of each of the optical system components and to make these components available until the end of their expected operating lives.

Further, in the image projection apparatus 100 according to the present embodiment, the air discharge fan 175 is so provided as to be closer to the front face 102*a* side than the heat generation components that generate heat among the optical system components that constitute the optical system unit. Specifically, as illustrated in FIG. 2, the air discharge fan 175 is so provided as to be closer to the front face 102*a* side than the light source unit 110 that is provided to be most toward on the front face 102*a* among the optical system components, and also between the light source unit 110 and the air discharge port 106. In a case where the air discharge fan 175 is driven, air inside the first space 105*a* is discharged outside. This allows an air discharge flow path to be formed in which fresh air is taken from the air intake ports 104*a* and 104*b* on the rear face 102*b* side to the first space 105*a*, and, after the air passing through and cooling the heat generation components of the optical system unit, the resultant air is discharged from the air discharge port 106 via the air discharge fan 175.

Further, as described above, in the present embodiment, a component having a large amount of heat generation is provided on the front face 102*a* side, and providing the air discharge fan 175 on the front face 102*a* side allows an air discharge flow path to be formed in which a component having a large amount of heat generation is cooled at the end, following which the resultant air is discharged outside.

In this way, providing the air discharge fan 175 on the front face 102a side inside the housing 102 allows a flow of air going from the air intake ports 104a and 104b toward the air discharge port 106 to be formed and makes it possible to efficiently cool the optical system components. Further, providing the air discharge fan 175 on a linear line going from the air intake ports 104a and 104b of the rear face 102b toward the air discharge port 106 of the front face 102a makes it possible to prevent the air that has been warmed during flowing inside the first space 105a from staying longer in the first space 105a. This makes it possible to cause the inner space of the housing 102 to be less likely to be warmed, leading to the improvement of cooling efficiency.

Further, in order to efficiently perform heat discharge of the optical system components, a heat sink may be provided as necessary for the first space 105a. For example, as illustrated in FIG. 4, a heat sink 115 may be provided for the light source unit 110 in which the temperature becomes high. The heat sink 115 may be provided on, for example, an upper face, a front face, and a side face of the light source unit 110. In the cooling structure of the image projection apparatus 100 according to the present embodiment, the air as a cooling medium flows, at the end, into the light source unit 110 that has the highest temperature among the optical system components, passes through the heat sink 115, and is discharged outside the housing 102 from the air discharge port 106. Providing the heat sink 115 in the light source unit 110 makes it possible to efficiently cool the light source unit 110.

<3. Conclusion>

The image projection apparatus 100 and the cooling structure formed in the image projection apparatus 100 according to an embodiment of the present disclosure are described as above. According to the present disclosure, within the housing 102 of the image projection apparatus 100, the air intake ports 104a and 104b are provided on the rear face 102b side, and the air discharge port 106 are provided on the front face 102a side. Further, the cooling fans 171, 173r, 173b, and 173g are so provided as to be closer to the rear face side than the heat generation components that generate heat among the optical system components, and thereby the heat generation components are cooled from the rear face side. This causes air before its temperature increases inside the housing to be blown against the heat generation components, making it possible to efficiently cool the optical system components. Further, providing the air discharge fan 175 closer to the front face 102a side than the heat generation components that generate heat among the optical system components constituting the optical system unit allows an air discharge flow path to be formed in which air passes through and cools the heat generation components of the optical system unit, following which the air is discharged from the air discharge port 106 via the air discharge fan 175. This makes it possible to efficiently cool the optical system components. The improvement of cooling efficiency in this way makes it possible to obtain a sufficient effect even when the size of the cooling fan is made small. Therefore, it is possible to make an apparatus small and reduce cost.

Further, providing the air intake port on the rear face side prevents dust, etc. from being taken inside the housing 102, as compared with a case in which air is taken from a side of a face facing, for example, an installation face. Further, the cooling fans 171, 173r, 173b, and 173g are so provided that the air intake faces 171a, r1, b1, and g1 are in substantially parallel with the air discharge flow paths A and B going from the air intake ports 104a and 104b toward the air discharge port 106. This prevents the air discharge flow paths A and B from being blocked by the cooling fans 171, 173r, 173b, and 173g, making it possible to improve cooling efficiency.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment described above, the light source of the light source unit is a light emitting diode or a semiconductor laser. However, the present technology is not limited to these examples. For example, the present technology is effective even in a case where a conventionally used lamp light source is used as a lamp light source.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image projection apparatus that is a short focus projector including a short focus lens as a projection lens that projects an image on a projection face, the image projection apparatus including:

an optical system unit including an optical system component including the projection lens;

an air intake port that is provided on a rear face of a housing containing the optical system unit and through which air is caused to flow into an inside of the housing;

an air discharge port that is provided on a front face of the housing and through which air inside the housing is discharged; and one or more cooling fans that are provided to be closer to a rear face side than a heat generation component that generates heat among the optical system components, in the inside of the housing.

(2)

The image projection apparatus according to (1), in which the cooling fan is provided to prevent an air discharge flow path inside the housing from being blocked.

(3)

The image projection apparatus according to (1) or (2), in which the cooling fan is a sirocco fan, and the sirocco fan is provided to allow an air intake face to be in substantially parallel with an air discharge flow path going from the air intake port toward the air discharge port.

(4)

The image projection apparatus according to any one of (1) to (3), in which regarding the optical system unit, a polarization conversion element and a liquid crystal display element, among the heat generation components of the optical system unit, are provided on a rear side of the housing; and the cooling fan is provided between the polarization conversion element and the liquid crystal display element, and the air intake port.

(5)

The image projection apparatus according to any one of (1) to (4), in which the housing has a shape in which a length in a width direction in which side faces face each other is greater than a length in a depth direction in which the front face faces the rear face, and the optical system unit is configured to allow a light source unit and the projection lens to be provided on a front face side of the housing, and to allow a polarization conversion element and a liquid crystal display element to be provided on a rear face side of the housing.

(6)

The image projection apparatus according to any one of (1) to (5), in which the air discharge port is provided as a single piece.

(7)

An image projection apparatus that is a short focus projector including a short focus lens as a projection lens that projects an image on a projection face, the image projection apparatus including:

an optical system unit including an optical system component including the projection lens;

an air intake port that is provided on a rear face of a housing containing the optical system unit and through which air is caused to flow into an inside of the housing;

an air discharge port that is provided on a front face of the housing and through which air inside the housing is discharged; and an air discharge fan that is provided to be closer to a rear face side than a heat generation component that generates heat among the optical system components, in the inside of the housing.

REFERENCE SIGNS LIST 100 image projection apparatus
102 housing
102a front face
102b rear face
102c, 102d side face
102e partition
103 housing
103b rear face
104a, 104b air intake port
105a first space
105b second space
106 air discharge port
110 light source unit
115 heat sink
120 fluorescent body wheel unit
130 polarization conversion element unit
135 polarization conversion element
140 liquid crystal display element unit
145 liquid crystal display element
150 projecting unit
160 electric power supply unit
171, 173 (173r, 173b, 173g), 179 cooling fan
175 air discharge fan
177 auxiliary fan

The invention claimed is:

1. An image projection apparatus, the image projection apparatus comprising:
an optical system including a polarization converter, a fluorescent body wheel, a light source, and a short focus lens that projects an image on a projection face;
an air intake port through which air is caused to flow into an inside of a housing including the optical system, the air intake port being provided on a first face of the housing;
an air discharge port that is provided on a second face of the housing and through which the air inside the housing is discharged, the second face being opposite to the first face;
a cooling fan inside the housing, the cooling fan being closer to the first face of the housing than the polarization converter in the optical system; and
an air discharge fan that is provided along an air discharge flow path from the air intake port toward the air discharge port, wherein
the air cools the optical system in an order of the polarization converter, the fluorescent body wheel, and the light source.

2. The image projection apparatus according to claim 1, wherein the cooling fan is provided to prevent the air discharge flow path inside the housing from being blocked.

3. The image projection apparatus according to claim 1, wherein
the cooling fan is a sirocco fan, and
the sirocco fan is provided to allow an air intake face of the cooling fan to be substantially parallel with the air discharge flow path.

4. The image projection apparatus according to claim 1, wherein
the optical system includes a liquid crystal display; and
the cooling fan is provided between (i) the polarization converter and the liquid crystal display, and (ii) the air intake port.

5. The image projection apparatus according to claim 1, wherein
the housing has a shape in which a length in a width direction in which side faces of the housing face each other is greater than a length in a depth direction in which the second face of the housing faces the first face of the housing, and
the optical system is configured to allow the light source and the short focus lens to be provided on a first side of the housing, and to allow the polarization converter and a liquid crystal display to be provided on a second side of the housing.

6. The image projection apparatus according to claim 1, wherein the air discharge port is provided as a single piece.

7. An image projection apparatus, the image projection apparatus comprising:
an optical system including a polarization converter, a fluorescent body wheel, a light source, and a short focus lens that projects an image on a projection face;
an air intake port through which air is caused to flow into an inside of a housing, the air intake port being provided on a first face of the housing containing the optical system;
an air discharge port that is provided on a second face of the housing and through which the air inside the housing is discharged, the second face being opposite to the first face; and
an air discharge fan that is provided along an air discharge flow path from the air intake port toward the air discharge port, wherein
the air cools the optical system in an order of the polarization converter, the fluorescent body wheel, and the light source.

8. The image projection apparatus according to claim 1, wherein
the air discharge flow path is substantially parallel to a side face of the housing.

9. The image projection apparatus according to claim 8, wherein the air passes through the polarization converter after passing through the air intake port and before being discharged through the air discharge port.

10. The image projection apparatus according to claim 1, further comprising:
   another cooling fan, wherein
   another air discharge flow path is formed inside the housing by blowing the air using the cooling fan and the other cooling fan, and
   the air discharge flow path is substantially parallel to the other air discharge flow path.

11. The image projection apparatus according to claim 10, wherein
   the other cooling fan is provided inside the housing closer to the first face of the housing than the optical system.

12. The image projection apparatus according to claim 1, further comprising:
   another air intake port that is provided on the first face of the housing.

13. The image projection apparatus according to claim 10, wherein
   the optical system includes a liquid crystal display, and
   the air cools the optical system in an order of the liquid crystal display and the light source.

14. The image projection apparatus according to claim 1, wherein the air discharge fan is provided between the air discharge port and the light source inside the housing.

15. The image projection apparatus according to claim 1, wherein the air discharge fan is closer to the second face of the housing than the light source in the optical system.

\* \* \* \* \*